United States Patent

[11] 3,621,905

| | | | | |
|---|---|---|---|---|
| [72] | Inventor | Bengt Hedstrom Gothenburg, Sweden | [51] | Int. Cl. ................................................ F28d 13/00 |
| [21] | Appl. No. | 8,189 | [50] | Field of Search ........................................... 165/1, 104 |
| [22] | Filed | Feb. 3, 1970 | [56] | References Cited |
| [45] | Patented | Nov. 23, 1971 | | UNITED STATES PATENTS |
| [73] | Assignee | Rederiaktiebolaget Nordstjernan Nynashamn, Sweden | 2,895,719 | 7/1959 Blaskowski.................. 165/104 |
| [32] | Priority | Feb. 10, 1969 | 3,075,580 | 1/1963 Davis, Jr....................... 165/104 |
| [33] | | Sweden | | |
| [31] | | 1763/69 | | |

Primary Examiner—Charles Sukalo
Attorney—Brumbaugh, Graves, Donohue & Raymond

[54] METHOD OF IMPROVING THE HEAT TRANSPORT IN A TUBE OF AN EVAPORATOR OR OTHER COOKING APPARATUS
3 Claims, 1 Drawing Fig.

[52] U.S. Cl. .................................................. 165/1, 165/104

ABSTRACT: This invention improves the heat transport in a tube of, for example, an evaporator in that the preheating zone for heating a fluid supplied at the lower tube end during its upward flow is shortened by supplying a solid phase of particles to the fluid and maintaining it fluidizing in a particle bed by the upward flow of the fluid.

PATENTED NOV 23 1971 3,621,905
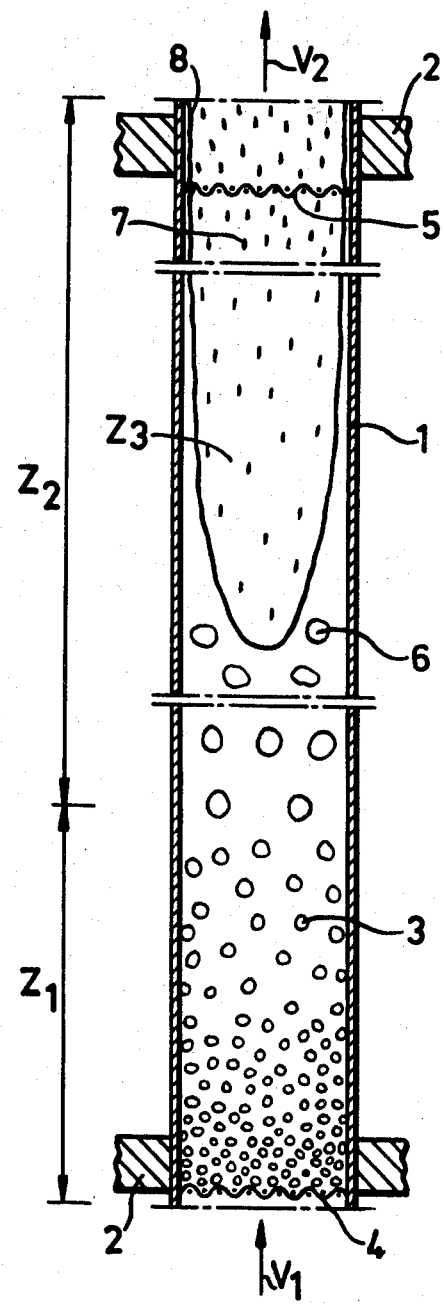

METHOD OF IMPROVING THE HEAT TRANSPORT IN A TUBE OF AN EVAPORATOR OR OTHER COOKING APPARATUS

This invention relates to a method of improving in a tube of an evaporator or other cooking apparatus by an upwardly directed one-phase and/or two-phase flow of fluid the heat transport conditions in the tube, the fluid being supplied at the lower end of the tube and heated during its upward flow through a lower portion of the tube, the preheating zone.

The method according to the invention, thus, can be utilized both at one-phase flow (liquid or gas flow) and at two-phase flow (gas/liquid flow) in a tube. The invention is particularly, but not exclusively, adapted to be applied in tube evaporators.

The method according to the invention is substantially characterized in that for shortening the preheating zone a solid phase of particles is supplied to the fluid in the tube and maintained fluidizing in a particle bed by the upward flow of the fluid through said particle bed.

The fluidization phenomenon utilized has been applied previously in other connections. Particularly two-phase fluidization (solid phase/liquid or gas) often has been utilized in chemical technology, for example at the drying of solid particles and for carrying out chemical reactions in industrial reactors using catalysts of particle state. Three-phase fluidization, however, at which liquid fluidizes a bed of solid particles in the simultaneous presence of greater or smaller amounts of transported gas, is a phenomenon which technically has been utilized only to a limited extent in certain chemical reactors.

As mentioned in the introductory portion, the technically economic usefulness of the invention is the improvement of the heat transport in a tube. In addition, the invention renders it possible to maintain the inner surface of the tube clean by means of the irregular but active radial transport of the solid particles against the tube wall. In a great number of processes, the combination of both of these effects is utilized.

The cleaning effect is as mentioned previously known and should in principle be easy to understand. The effect of the two-phase and/or three-phase fluidization, however, will be dealt with in greater detail in the following, with reference to what from a flow and heat transport point of view takes place in an ordinary tube evaporator, for example of so-called long-tube type. In the lowermost portion of the tube the liquid flows upwards whereby it is heated, but normally without boiling, and in any case normally without formation of large steam bubbles in the center of the tube. The temperature of the tube wall and thereby the prerequisite conditions for boiling immediately adjacent the inside of the tube wall can be different. When using as heating medium on the outside of the tubes water vapor of a sufficiently high saturation temperature, the tube wall temperature on the inside may reach such high values, that they give rise to boiling (nucleate boiling). The resulting small steam bubbles on the inside of the tube wall may either be condensed immediately by the upwardly flowing colder liquid bulk or during the vertically upward transport grow to larger steam bubbles. Which of these two phenomena will occur, depends on the interaction between factors of importance for the connected flow and heat transport processes: such as the liquid temperature in the film closest to the tube wall, the steam pressure of the liquid as a function of the temperature, the liquid temperature in the "bulk" at the tube level in question, the difference in temperature between the tube wall and liquid, and the liquid pressure at the same level. The conditions normally are arranged such that a pulsating flow is obtained in the tubes and an active boiling takes place in a large part of the tube. The level above which the bulk of the liquid can be regarded to boil, is theoretically corresponded by the level at which the pressure in the tube just falls below the saturation steam pressure of the liquid. From this tube level and upwardly to the outlet, the temperature decreases continuously against the counterpressure at the upper open end of the tubes. For obtaining in an evaporator of the kind in question maximum evaporation capacity, high speeds have to be realized on the inside of the tube at the same time as a portion as large as possible of the maximum available (so-called apparent) temperature difference (i.e., difference between the saturation temperature of the condensing steam and the liquid temperature at the uppermost end of the tube) is utilized at every level of the tube. This implies in practice that stationary boiling in the liquid is desired to commence on a level as low as possible. Hereof can be understood the importance of shortening the so-called preheating zone at the lower end of the tube to the greatest possible extent. The present invention renders possible just such a shortening of the preheating zone by the more effective heat transport owing to the presence of fluidized solid phase. The effect of the fluidized bed favorable from a heat transport point of view is relatively greatest in the lower part of the tube where the liquid film velocities at the tube wall still are relatively low. Higher up in the tube where by violent boiling possibly an annular flow has been effected, i.e., a more or less strongly pulsating liquid film flow along the tube wall and a substantially continuous steam column in the center of the tube, the heat transport conditions normally should be so favorable that the heat transport speed is high even without fluidized solid phase. In the area between these extremes, i.e., between the preheating zone in the lower part of the tube and the annular flow in the uppermost part of the tube, there prevail, in principle, the conditions for the aforementioned three-phase fluidization. The presence of solid fluidized phase in this zone favorably affects the heat transport conditions analogous to what above was said with respect to the preheating zone, i.e., the annular flow zone tends to be moved downwardly in the tube.

An idea of the degree of improvement achievable for the heat transport in the preheating zone by utilizing the present invention can be obtained by a comparison of the heat transfer coefficient ($\alpha$) with the coefficient obtained at two-phase fluidization at conditions which are comparable in the remaining respects. In the former case, for example, at water of about 70° C., $\alpha$ often is only 50 kcal./m.$^2$hr.° C., while at two-phase fluidization the $\alpha$-values obtained against the vessel wall normally are between 500 and 2,500 kcal./m.$^2$hr.° C. In consideration of what above has been said that it is important in evaporators operating with so-called "self-circulation" (long-tube evaporators) to commence the boiling on a level as low as possible, it is understood that under certain conditions also a relatively moderate increase of the heat transport in the lower part of the tube can have a substantial positive effect on the liquid amount evaporated in the tube.

A further effect of a likewise favorable kind is achieved with respect to the stability of the flow, for example in tubes connected in parallel in an evaporator. The term stability is to be understood in this context as the uniform distribution of flowing liquid/steam in the tubes. It is well known that by inserting extra throttlings in the (lower) inlet end of the tubes a possible available pressure drop can be utilized for effecting higher liquid flow rates and thereby to improve the heat transport in the preheating zone. In practice, however, this idea has not been applied to a degree worth mentioning, primarily due to the clogging risk of the throttlings. A correctly dimensioned liquid-fluidized bed at the lower end of the tube, according to the invention, does not constitute an appreciable risk of increased clogging.

By utilizing a fluidized bed according to the invention, the heat transport improvement, as explained above, is not brought about primarily by the increase of the apparent (nominal) flow rate in the tube, but by the favorable effect of the solid particles on the heat transport from the tube wall. Owing to the pressure drop caused by the particle bed also the stability is improved, as described above, for example, for the tubes connected in parallel. Since in a tube operating after the principle of self-circulation the flow is pulsating, one can understand that it is possible in principle, by utilizing the invention, to increase the number of tubes operating effectively at a certain moment, i.e., such tubes in which the upwardly directed flow rate is high in a large part of the tube. It is not generally possible on the basis of calculation simply to estimate the size of this positive effect, as the conditions vary too much. One may, however, say in general that in apparatus operating with low load (low temperature differences) and thereby with low heat transfer coefficient, said positive effect is relatively high.

The method according to the invention preferably is further characterized in that the particles are prevented from being taken along by the flow of the fluid above a certain level in the tube. Hereby it is possible to maintain the particle bed at the desired level in the tube even when the speeds during operation temporarily will be too high. In practice one may, for example, mount grids of suitable dimensions which constitute obstacles to the passage of the solid particles, but allow for the free passage of liquid and/or gas.

At the method according to the invention, furthermore, the particles suitably are prevented from sinking below a certain level in the tube. By this additional characterizing feature of the method according to the invention the particle bed is supported even if occasionally it is not in fluidized state or if temporarily the speeds developed in operation are too low. Also this can be realized by suitably dimensioned grids constituting obstacles to the passage of the solid particles, but allowing for free passage of liquid and/or gas.

According to still a further characterizing feature of the invention, several separated fluidized particle beds are effected in the flow path of the fluid. In practice, these separated particle beds can be obtained by the arrangement of grids of the aforementioned design.

The present invention can be utilized in most different ways. It is, for example, possible at a given speed for the fluid in the lower part of the tube or at a given fluidization rate (apparent speed of the fluid in the fluidized bed) to bring about several combinations of favorable conditions. Examples of freedom grades are particle size, particle density and particle amount. One may also operate with a mixture of particles having different density or size. Examples of particles which may be used are sand, glass, or mineral grains, further metal or plastic particles, in all cases with a definite particle size and density or in the form of suitably selected mixtures.

The tube diameter is a freedom degree of a certain importance. Also the optimum tube height can be affected to a high degree by use of the invention.

The introductory portion of this description includes the information that the invention is particularly, but not exclusively adapted for use at evaporators. The invention may, for example, be utilized also at other cooking operations, such as recooking apparatus at distillation columns, steam boilers, etc.

In the accompanying drawing the invention, by way of example, is shown applied at an evaporator. The drawing shows an axial section through a tube.

The tube shown in the drawing is designated by 1, and its support by 2. The fluidized solid particles supplied to the liquid are designated by 3. A lower carrying grid 4 is mounted for carrying the particle bed even if the bed, for example, occasionally is not in fluidized state or if during operation the speeds temporarily will be too low. In addition, an upper catching grid 5 is mounted for preventing particles from being taken along above the level of this grid. The grids 4 and 5 are designed so as to prevent the passage of the solid particles, but to allow for the free passage of liquid and/or gas. The grids may, for example, be metal wire cloth of high porosity.

In the drawing, furthermore, the arrow $V_1$ indicates the entering liquid and the arrow $V_2$ indicates the outflowing liquid and steam. $Z_1$ is a zone for preheating or local boiling at the tube wall, $Z_2$ is a zone for bulk boiling, and $Z_3$ is a zone for annular flow. 6 designates steam bubbles in the liquid flow or steam/liquid particle flow, 7 designates liquid droplets in the steam flow, and 8 designates a liquid film.

The flow and heat transport conditions which may prevail in the tube, and the factors of influence thereon have been covered in the introductory portion of the description.

In said introductory portion also other apparatus of possible use for applying the invention as well as other variants lying within the scope of the invention have been mentioned.

What I claim is:

1. In a method for improving the volatilization capacity for a liquid flowing upwards in a tube having a lower preheating zone merging upwards into a boiling zone, the liquid being heated during its upward flow through the preheating zone, the improvement comprising supporting a bed of solid particles in the tube, and passing the liquid upwardly through the bed of particles at a sufficient flow rate to maintain the bed fluidized in at least the preheating zone, thereby extending the boiling zone downwardly in the tube and increasing the rate of heat transfer.

2. A method according to claim 1 wherein the fluidized bed of particles are maintained at a selected level within the tube.

3. A method according to claim 1 further comprising supporting a plurality of beds of solid particles in the tube and directing the liquid through the beds of particles to fluidize the particles.

* * * * *